United States Patent
Childress

(12) 
(10) Patent No.: US 11,434,023 B2
(45) Date of Patent: Sep. 6, 2022

(54) PRESENCE DETECTION SYSTEMS AND METHODS WITH INCREASED OCCUPANCY STATUS DETERMINATION

(71) Applicant: THE BOEING COMPANY, Chicago, IL (US)

(72) Inventor: Jamie J. Childress, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 448 days.

(21) Appl. No.: 16/515,122

(22) Filed: Jul. 18, 2019

(65) Prior Publication Data

US 2021/0016894 A1 Jan. 21, 2021

(51) Int. Cl.
| | |
|---|---|
| *G01L 19/00* | (2006.01) |
| *B64D 47/02* | (2006.01) |
| *G05D 1/10* | (2006.01) |
| *G01L 19/14* | (2006.01) |
| *B60R 25/30* | (2013.01) |
| *B64D 11/02* | (2006.01) |

(52) U.S. Cl.
CPC ............ *B64D 47/02* (2013.01); *G01L 19/147* (2013.01); *G05D 1/101* (2013.01); *B60R 25/30* (2013.01); *B64D 11/02* (2013.01)

(58) Field of Classification Search
None
See application file for complete search history.

(56) References Cited

U.S. PATENT DOCUMENTS

| | | | | |
|---|---|---|---|---|
| 6,079,669 | A * | 6/2000 | Hanay | B64D 11/02 |
| | | | | 4/312 |
| 9,283,997 | B2 * | 3/2016 | Wiegel | B62D 35/001 |
| 2005/0283891 | A1 * | 12/2005 | Lim | E03D 5/105 |
| | | | | 4/300 |
| 2012/0221192 | A1 * | 8/2012 | Seibt | G01N 21/6456 |
| | | | | 296/24.3 |
| 2014/0123571 | A1 * | 5/2014 | Swain | B64D 11/0023 |
| | | | | 29/401.1 |
| 2014/0291446 | A1 * | 10/2014 | Reams | B64D 11/02 |
| | | | | 244/118.5 |
| 2016/0273990 | A1 * | 9/2016 | Larsen | G01L 25/00 |
| 2017/0202991 | A1 * | 7/2017 | Childress | B64F 5/30 |
| 2017/0284076 | A1 * | 10/2017 | Jensen | B64C 1/18 |
| 2018/0156689 | A1 * | 6/2018 | McGranahan | G01M 7/027 |

\* cited by examiner

*Primary Examiner* — Brandi N Hopkins
*Assistant Examiner* — Nigel H Plumb
(74) *Attorney, Agent, or Firm* — The Small Patent Law Group LLC; Joseph M Butscher

(57) ABSTRACT

A support panel assembly includes a lower panel, an upper panel pivotally coupled to the lower panel by a central pedestal, and a first pressure sensor located about a center of the support panel assembly, and coupled to the central pedestal. The first pressure sensor detects pressure exerted into the upper panel in response to the upper panel pivoting in relation to the lower panel about the central pedestal. The first pressure sensor outputs a pressure signal indicative of pressure exerted into the upper panel. In at least one embodiment, the pressure signal is received by a detecting control unit.

23 Claims, 6 Drawing Sheets

PRESENCE DETECTION SYSTEMS AND METHODS WITH INCREASED OCCUPANCY STATUS DETERMINATION

FIELD OF THE DISCLOSURE

Embodiments of the present disclosure generally relate to presence detection systems and methods for enclosed spaces, such as lavatories, which may be used within interior cabins of commercial aircraft, and more particularly, to presence detection systems and methods that include support panel assemblies.

BACKGROUND OF THE DISCLOSURE

Aircraft transport passengers between locations. A typical commercial aircraft includes at least one lavatory within an interior cabin. During a flight, passengers may use the lavatory. In order to prevent or otherwise reduce lines for the lavatory, a sign proximate to the lavatory indicates whether the lavatory is occupied or unoccupied. When the door of the lavatory is locked, the sign indicates that the lavatory is occupied. That is, an individual within the lavatory locking the lavatory door causes a sign proximate to the lavatory to indicate that the lavatory is occupied.

However, an individual within the lavatory may neglect to lock the lavatory door. In this situation, the sign indicates that the lavatory is unoccupied even through the individual is within the lavatory. In short, an individual within the lavatory typically needs to affirmatively perform a specific task, in particular locking the door, to indicate that the lavatory is occupied.

Further, ultraviolet (UV) cleaning systems that are configured to sanitize components within lavatories are currently being developed. Cleaning cycles for certain UV cleaning systems may be three seconds or less. An indication of occupancy of a lavatory within an aircraft via a passenger locking/unlocking a door is typically delayed. For example, the time from the passenger unlocking a lavatory door to an indication that the lavatory is no longer occupied may be a few seconds. However, a cleaning process may not commence until the lavatory is determined to be unoccupied.

SUMMARY OF THE DISCLOSURE

A need exists for a system and method for accurately determining whether or not a lavatory, such as within a commercial aircraft, is occupied. Further, a need exists for a system and method for determining the occupancy of a lavatory without an individual performing a specific task to indicate such occupancy. Moreover, a need exists for a system and method for quickly and efficiently determining an occupancy status of a lavatory.

With those needs in mind, certain embodiments of the present disclosure provide a support panel assembly that includes a lower panel, an upper panel pivotally coupled to the lower panel by a central pedestal, and a first pressure sensor coupled to the central pedestal. The first pressure sensor detects pressure exerted into the upper panel in response to the upper panel pivoting in relation to the lower panel about the central pedestal.

The first pressure sensor outputs a pressure signal indicative of pressure exerted into the upper panel. The pressure signal is received by a detecting control unit. The detecting control unit compares the pressure signal to a pressure threshold to determine presence of an individual on the support panel assembly.

In at least one embodiment, the central pedestal is formed of an elastomeric material. In at least one embodiment, the first pressure sensor is disposed between the central pedestal and the upper panel. In at least one example, the first pressure sensor is located about a center of the support panel assembly.

In at least one embodiment, the support panel assembly also includes bumpers extending downwardly from a lower surface of the upper panel. For example, the bumpers are spaced apart from the lower panel.

In at least one embodiment, the support panel assembly also includes a sealing closeout that extends around outer peripheral edges of the lower panel and the upper panel. The sealing closeout seals an internal chamber defined between the lower panel and the upper panel. As another example, a vent tube extends into the internal chamber.

In at least one embodiment, the support panel assembly also includes at least one additional pressure sensor. For example, the support panel assembly also includes a second pressure sensor at a first corner, a third pressure sensor at a second corner, a fourth pressure sensor at a third corner, and a fifth pressure sensor at a fourth corner.

Certain embodiments of the present disclosure provide a presence detection system that includes a support panel assembly within an internal space. The support panel assembly includes a lower panel, an upper panel pivotally coupled to the lower panel by a central pedestal, bumpers extending downwardly from a lower surface of the upper panel, and a first pressure sensor coupled to the central pedestal. The first pressure sensor detects pressure exerted into the upper panel in response to the upper panel pivoting in relation to the lower panel about the central pedestal. The first pressure sensor signal outputs a pressure signal indicative of the pressure exerted into the upper panel. A sealing closeout extends around outer peripheral edges of the lower panel and the upper panel. The sealing closeout seals an internal chamber defined between the lower panel and the upper panel. A vent tube extends into the internal chamber. A detecting control unit is in communication with the first pressure sensor. The pressure signal is received by the detecting control unit. The detecting control unit compares the pressure signal to a pressure threshold to determine presence of one or both of an individual or an object on the support panel assembly.

In at least one embodiment, the internal space is within an interior cabin of a vehicle. In at least one embodiment, the internal space is a lavatory.

Certain embodiments of the present disclosure provide a presence detection method that includes providing a support panel assembly within an internal space. The providing the support panel assembly includes pivotally coupling an upper panel to a lower panel by a central pedestal, and coupling a first pressure sensor to the central pedestal. The presence detection method also includes detecting, by the first pressure sensor, pressure exerted into the upper panel in response to the upper panel pivoting in relation to the lower panel about the central pedestal, and outputting, by the first pressure sensor, a pressure signal indicative of the pressure exerted into the upper panel to a detecting control unit in communication with the first pressure sensor.

In at least one embodiment, the presence detection method further includes communicatively coupling the detecting control unit with flight controls for an autonomous aircraft. The presence detection method may also include sending, by the detecting control unit, a presence signal to the flight controls indicating a presence of at least one individual in an interior cabin of the autonomous aircraft.

The presence detection method may also include adjusting operation of the autonomous aircraft based on the presence signal. The presence detection method may also include adjusting security controls based on detected presence of weight within the interior cabin.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a presence detection system including a support panel assembly having at least one pressure sensor. In at least one embodiment, the pressure sensor(s) is in communication with a detecting control unit that receives pressure signals from the pressure sensor(s). The detecting control unit determines whether weight, such as from an individual, is on the support panel assembly. As such, the detecting control unit is configured to determine whether an internal space, such as a lavatory having the support panel assembly, is occupied. Detecting occupation of the lavatory, such as within an aircraft, ensures that a sanitizing system, such as an ultraviolet cleaning system, is not activated when an individual is within the lavatory.

In at least one other embodiment, the detecting control unit is configured to determine weight distribution within an internal space including the support panel assembly. The internal space may be within an internal cabin of a vehicle, such as an autonomous aircraft. Analysis of the weight distribution within such a vehicle allows for individuals and items within the vehicle to be positioned and repositioned therein to ensure efficient operation of the vehicle.

Figure 1:
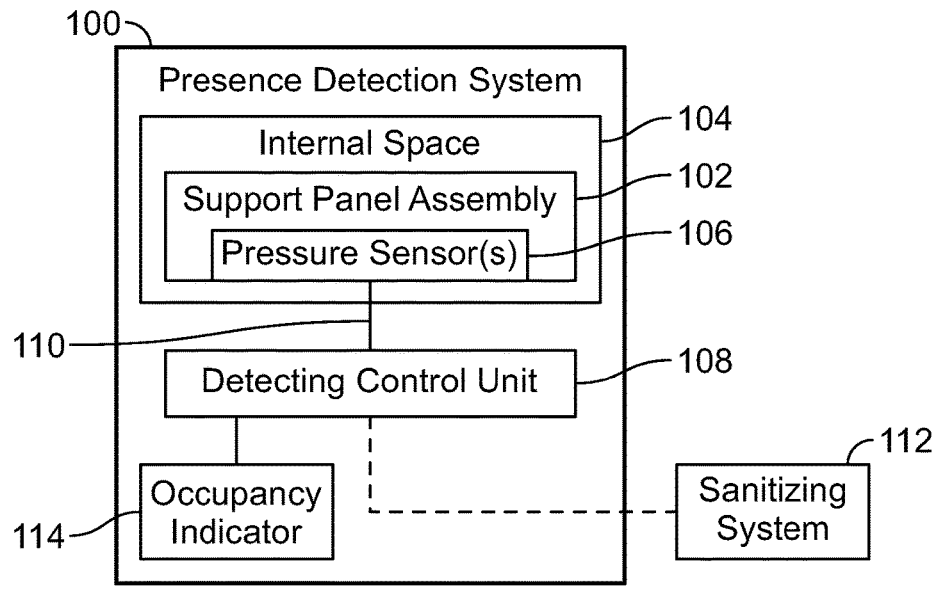
FIG. 1 illustrates a schematic block diagram of a presence detection system, according to an embodiment of the present disclosure.

FIG. 1 illustrates a schematic block diagram of a presence detection system 100, according to an embodiment of the present disclosure. The presence detection system 100 includes a support panel assembly 102 within an internal space 104. In at least one example, the internal space 104 is a lavatory within a vehicle, such as a commercial aircraft. In at least one example, the internal space 104 is an internal passenger cabin of a vehicle, such as a commercial aircraft or an autonomous vehicle.

The support panel assembly 102 includes one or more pressure sensors 106. The pressure sensor(s) 106 are configured to detect pressure, such as weight, exerted into the support panel assembly 102. As such, the pressure sensor(s) 106 are configured to detect the presence of individuals and objects on the support panel assembly 102. As an example, the pressure sensor(s) 106 are resistance sensors in which resistance changes as pressure exerted therein changes. As another example, the pressure sensor(s) 106 are piezoelectric pressure sensors.

In at least one embodiment, the pressure sensor(s) 106 are in communication with a detecting control unit 108, such as through one or more wired or wireless connections. In at least one embodiment, the detecting control unit 108 is remotely located from the internal space 104. In at least one other embodiment, the detecting control unit 108 is also within the internal space 104. In at least one embodiment, the detecting control unit 108 is separate and distinct from the support panel assembly 102. In at least one other embodiment, the detecting control unit 108 is within the support panel assembly 102.

In operation, the pressure sensor(s) 106 output pressure signals 110 to the detecting control unit 108. For example, as an individual steps on the support panel assembly 102, the pressure sensor(s) 106 detects the force of the weight of the individual exerted thereon, and outputs the pressure signal 110 related to the weight of the individual to the detecting control unit 108. In response, the detecting control unit 108 determines that an individual is within the internal space on the support panel assembly 102.

In at least one embodiment, the detecting control unit 108 is also in communication with a sanitizing system 112, such as via one or more wired or wireless connections. In at least one embodiment, the sanitizing system 112 is configured to automatically clean at least a portion of the internal space 104 (such as a toilet, sink, or the like within a lavatory). In at least one embodiment, the sanitizing system 112 automatically cleans the portion(s) of the internal space 104 when the internal space 104 is unoccupied. In at least one embodiment, the sanitizing system 112 includes one or more ultraviolet lights that are configured to sanitize portions of the internal space 104 through emission of ultraviolet radiation. The detecting control unit 108 ensures that the sanitizing system 112 is not active when the detecting control unit 108 determines that the internal space 104 is occupied through analysis of the pressure signal 110. Optionally, the detecting control unit 108 is not in communication with a sanitizing system 112.

In at least one embodiment, the detecting control unit 108 compares the pressure signal 110 received from the pressure sensor(s) 106 with a presence threshold to determine whether the internal space 104 is occupied. The presence threshold is stored in a memory of, or otherwise in communication with, the detecting control unit 108. The presence threshold is a magnitude below which the detecting control unit 108 determines that an individual is not within the internal space. For example, the presence threshold is 10 pounds. In at least one other embodiment, the presence threshold is greater or less than 10 pounds. As an example, if the pressure sensor(s) 106 outputs the presence signal 110 indicative of 3 pounds on the support panel assembly 102, the detecting control unit 108 determines that the internal space 104 is not occupied by an individual. As an example, the 3 pounds of weight may be the weight of certain supplies within the internal space. If, however, the received presence signal 110 is greater than 10 pounds, the detecting control unit 108 determines that the internal space 104 is occupied by at least one individual.

In at least one embodiment, the detecting control unit 108 is also in communication with an occupancy indicator 114, such as through one or more wired or wireless connections. In at least one embodiment, the occupancy indicator 114 is an illuminated sign that is configured to switch between indications of occupied and unoccupied. In at least one other embodiment, the occupancy indicator 114 is a digital screen, monitor, or the like that shows text and/or video. In at least one embodiment, the occupancy indicator 114 is also configured to indicate that a cleaning process is in progress. The detecting control unit 108 switches status of the occupancy indicator 114 between occupied and unoccupied based on the presence signal(s) 110 received from the pressure sensor(s) 106. Optionally, the detecting control unit 108 is not in communication with an occupancy indicator.

Figure 2:
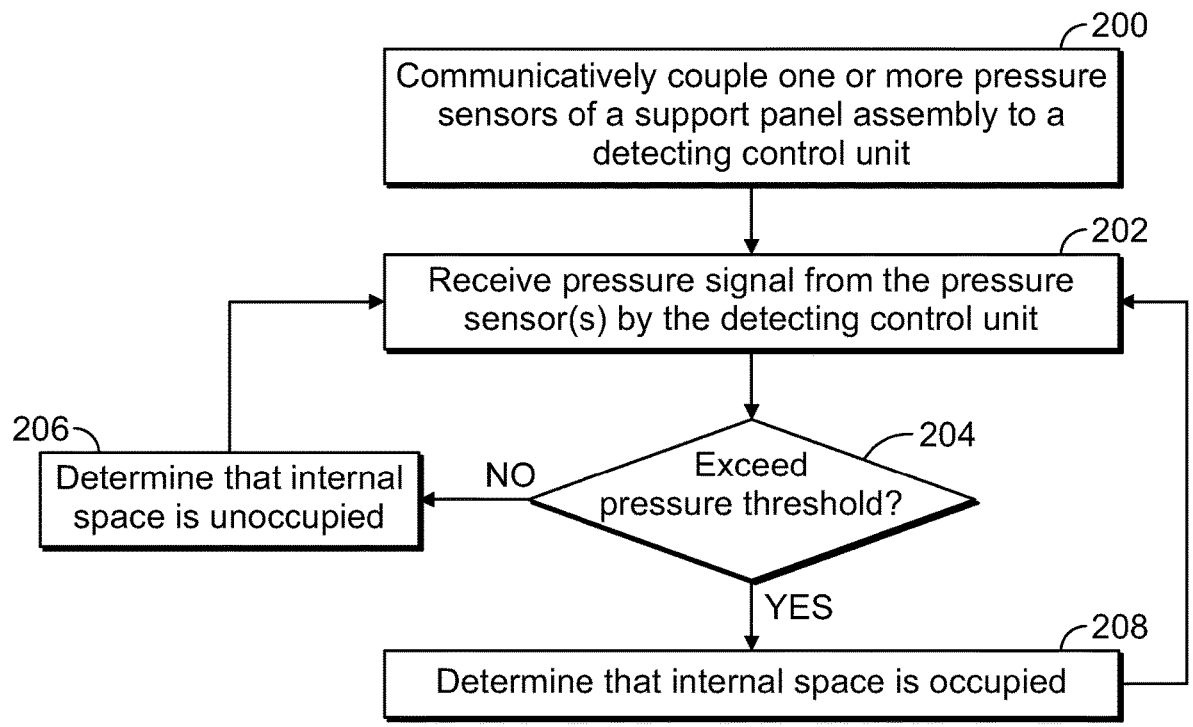
FIG. 2 illustrates a flow chart of a presence detection method, according to an embodiment of the present disclosure.

FIG. 2 illustrates a flow chart of a presence detection method, according to an embodiment of the present disclosure. Referring to FIGS. 1 and 2, at 200, the pressure sensors 106 of the support panel assembly 102 are communicatively coupled to the detecting control unit 108. At 202, the detecting control unit 108 receives the pressure signal 110 output by the pressure sensor(s) 106. At 204, the detecting control unit 108 determines if the pressure signal 110 exceeds the pressure threshold. If the pressure signal 110 does not exceed the pressure threshold, the method proceeds to 206, at which the detecting control unit 108 determines that the internal space 104 is not occupied. The method then returns to 202. If, however, the pressure signal 110 does exceed the pressure threshold, the method proceeds from 204 to 208, at which the detecting control unit 108 determines that the internal space 104 is occupied. The method then returns to 202.

As used herein, the term "control unit," "central processing unit," "unit," "CPU," "computer," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. In at least one embodiment, the detecting control unit 108 is or includes one or more processors that are configured to control operation thereof, as described herein.

The detecting control unit 108 is configured to execute a set of instructions that are stored in one or more data storage units or elements (such as one or more memories), in order to process data. For example, the detecting control unit 108 includes or is coupled to one or more memories. In at least one embodiment, the data storage units or other information as desired or needed. As an example, the data storage units are in the form of an information source or a physical memory element within a processing machine.

The set of instructions include various commands that instruct the detecting control unit 108 as a processing machine to perform specific operations such as the methods and processes of the various embodiments of the subject matter described herein. In at least one embodiment, the set of instructions is in the form of a software program. For example, the software is in various forms such as system software or application software. Further, in at least one embodiment, the software is in the form of a collection of separate programs, a program subset within a larger program or a portion of a program. In at least one embodiment, the software also includes include modular programming in the form of object-oriented programming. In at least one embodiment, the processing of input data by the processing machine is in response to user commands, or in response to results of previous processing, or in response to a request made by another processing machine.

The diagrams of embodiments herein illustrate one or more control or processing units, such as the detecting control unit 108. It is to be understood that, in at least one embodiment, the processing or control units represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. In at least one embodiment, the hardware includes state machine circuitry hardwired to perform the functions described herein. In at least one other embodiment, the hardware includes electronic circuits that include or are connected to one or more logic-based devices, such as microprocessors, processors, controllers, or the like. In at least one other embodiment, the detecting control unit 108 represents processing circuitry such as one or more of a field programmable gate array (FPGA), application specific integrated circuit (ASIC), microprocessor(s), or the like. The circuits in various embodiments are configured to execute one or more algorithms to perform functions described herein. The one or more algorithms include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
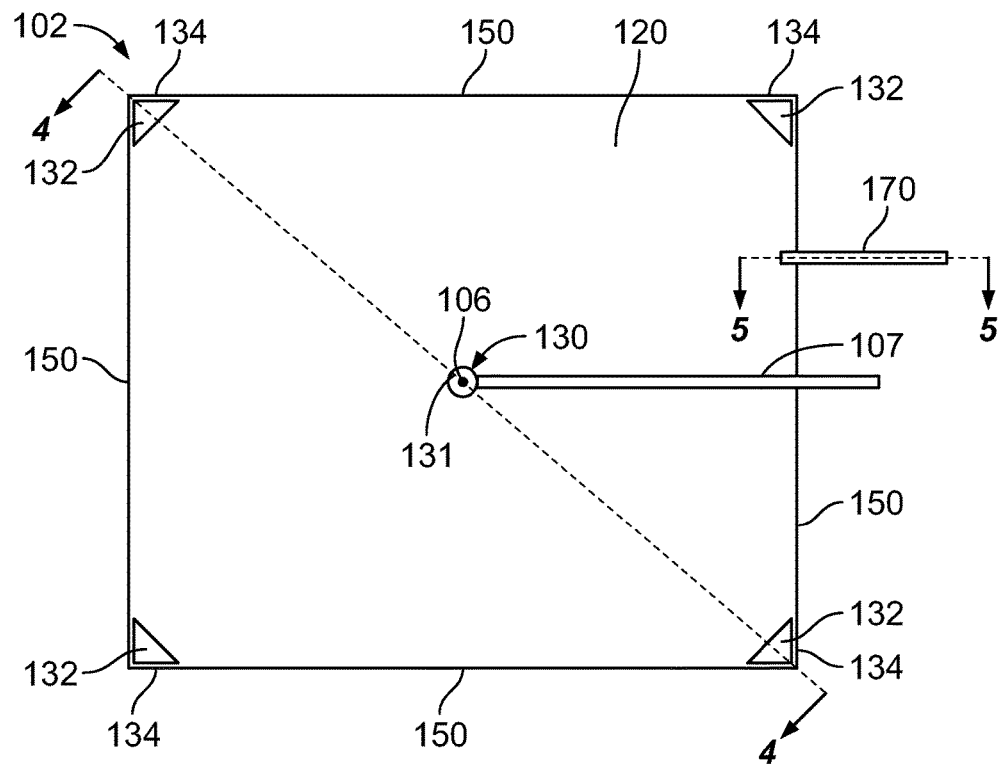
FIG. 3 illustrates a top view of a support panel assembly, according to an embodiment of the present disclosure.
Figure 4:
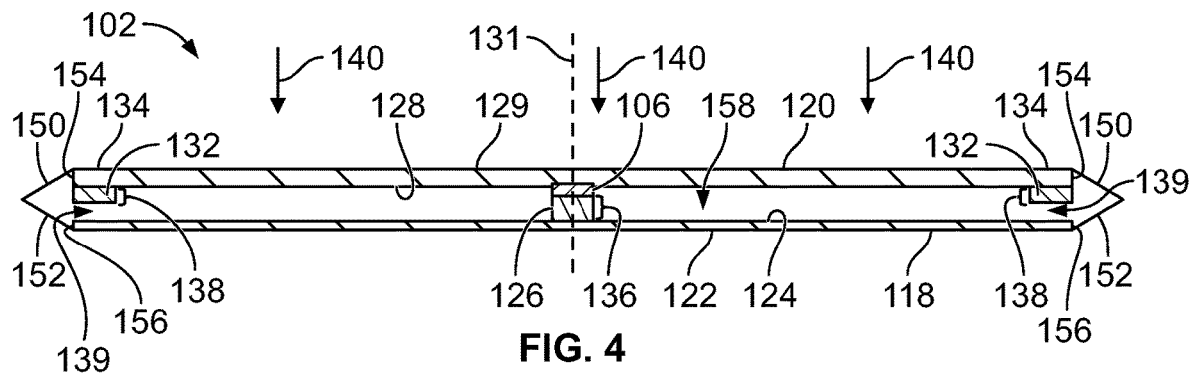
FIG. 4 illustrates a cross-sectional view of the support panel assembly through line 4-4 of FIG. 3.

FIG. 3 illustrates a top view of the support panel assembly 102, according to an embodiment of the present disclosure. FIG. 4 illustrates a cross-sectional view of the support panel assembly 102 through line 4-4 of FIG. 3. Referring to FIGS. 3 and 4, the support panel assembly 102 includes a lower panel 118 coupled to an upper panel 120. In at least one embodiment, the lower panel 118 is formed of a metal, such as aluminum, and the upper panel 120 is formed of a metal or composite material, such as graphite. Optionally, the upper panel 120 and the lower panel 118 are formed of the same material, such as a metal, plastic, composite material, and/or the like.

The lower panel 118 includes a lower surface 122 opposite from an upper surface 124. A central pedestal 126 is supported on the upper surface 124 and extends upwardly towards a lower surface 128 of the upper panel 120. The lower surface 128 of the upper panel 120 is opposite from an upper surface 129 on which an individual may stand and/or objects may be positioned.

In at least one embodiment, the central pedestal 126 is formed of a resilient material, such as elastomeric material, silicone, or the like. A single pressure sensor 106 is supported on the central pedestal 126 and is secured to the lower surface 128 of the upper panel 120. As such, the pressure sensor 106 is disposed (for example, sandwiched) between the central pedestal 126 and the upper panel 120. In at least one other embodiment, the pressure sensor 106 is sandwiched between the central pedestal 126 and the lower panel 118.

As shown in FIG. 3, in particular, the pressure sensor 106 is located about the center 130 (for example, aligned with and about a central axis 131 of the upper panel 120) of the support panel assembly 102. The location of the pressure sensor 106 about the center 130 of the support panel assembly 102 ensures that loads (such as pressure from weight of an individual) exerted anywhere on the upper panel 120 passes through the center 130, and therefore through the pressure sensor 106, which detects the loads.

In at least one embodiment, leads 107, such as electrical wiring, connect the pressure sensor 106 to a source of power, and/or the detecting control unit 108 (shown in FIG. 1). Optionally, the pressure sensor 106 is wirelessly connected to the source of power and/or the detecting control unit 108. In at least one other embodiment, the pressure sensor 106 includes an integral power source, such as a battery.

Bumpers 132 are located at the corners 134 of the support panel assembly 102. The bumpers 132 extend downwardly from the lower surface 128 of the upper panel 120. Each bumper 132 is formed of a resilient material, such as an elastomeric material, silicone, or the like.

As shown in FIG. 4, the central pedestal 126 has a height 136 that exceeds the heights 138 of the bumpers 132. For example, the height 136 is twice the height 138. In this manner, the central pedestal 126 lifts the upper panel 120 away from the lower panel 118 such that gaps 139 are formed underneath the bumpers 132. As such, the bumpers 132 are spaced apart from the lower panel 118. The gaps 139 allow the upper panel 120 to pivot about the central pedestal 126. As pressure is exerted downwardly onto the upper panel 120 in the directions of arrows 140, the upper panel 120 pivots in response thereto about the central pedestal 126. The pressure sensor 106 detects such pressure via the pivotal motion. As such, the pressure sensor 106 detects pressure exerted into a portion of the upper surface 129 of the upper panel 120 through the pivotal motion, and outputs the pressure signal 110 (shown in FIG. 1) in response thereto. In this manner, the single pressure sensor 106 is able to detect exerted pressure (such as the weight of an individual) into the upper surface 129.

As described herein, the support panel assembly 102 includes the lower panel 118, the upper panel 120 pivotally coupled to the lower panel 118 by the central pedestal 126, and the pressure sensor 106 (for example, a first pressure sensor) coupled to the central pedestal 126. The pressure sensor 106 detects pressure exerted into the upper panel 120 in response to the upper panel 120 pivoting in relation to the lower panel 118 about the central pedestal 126.

As shown in FIG. 3, the bumpers 132 are located at the corners 134 and separated from one another. In at least one other embodiment, the bumpers 132 may contiguously connect together along a periphery of the support panel assembly 102. In at least one other embodiment, the support panel assembly 102 does not include the bumpers 132.

In at least one other embodiment, the height 136 of the central pedestal 126 is the same as the height 138 of the bumpers 132. In this embodiment, the central pedestal 126 is stiffer than the bumpers 132 to allow the bumpers 132 to compress and the central pedestal 126 to flex, bend, or otherwise pivot as pressure is exerted into the upper surface 129.

A sealing closeout 150 extends along an outer periphery of the support panel assembly 102. The sealing closeout 150 is formed of a sealing agent, such as an elastomeric material, polymeric tape, or the like. In at least one embodiment, the sealing closeout 150 includes a bellows 152 that sealingly couples to outer peripheral edges 154 of the upper panel 120 and outer peripheral edges 156 of the lower panel 118, thereby providing a sealed barrier that protects against moisture from infiltrating into an internal chamber 158 defined between the lower panel 118 and the upper panel 120. The sealing closeout 150 protects the pressure sensor 106 from being exposed to moisture, such as when the support panel assembly 102 forms a portion of a floor of a lavatory. Alternatively, the support panel assembly 102 does not include the sealing closeout.

Figure 5:
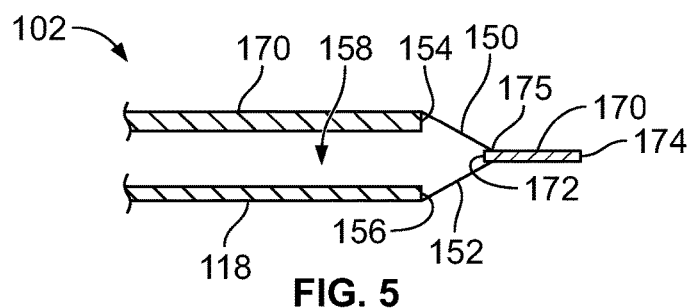
FIG. 5 illustrates a cross-sectional view of the support panel assembly through line 5-5 of FIG. 3.

FIG. 5 illustrates a cross-sectional view of the support panel assembly 102 through line 5-5 of FIG. 3. A vent tube 170 extends through a portion of the sealing closeout 150. In at least one embodiment, the vent tube 170 is formed of an elastomeric material. The vent tube 170 includes a first end 172 that fluidly connects to the internal chamber 158 and a second end 174 opposite from the first end 172. The second end 174 is in fluid communication with an environment outside of the internal chamber 158. The vent tube 170 allows air within the internal chamber 158 to adjust based on changing pressures outside of the support panel assembly 102, such as when the support panel assembly 102 is used within an aircraft. That is, the vent tube 170 allows for air within the internal chamber 158 to adaptively adjust based on changing air pressure. The vent tube 170 allows for venting of the internal chamber 158 to reduce a potential of unknown loads influencing the pressure sensor 106, such as during pressure changes caused by altitude changes. Alternatively, the support panel assembly 102 does not include the vent tube 170.

In at least one embodiment, the sealing closeout 150 is a bellows, tape, or the like that is formed of silicone, santoprene, or the like, and bonded to the peripheral edges 154 and 156. The vent tube 170 passes through a portion of the sealing closeout 150, which provides a sealing engagement around an outer portion 175 of the vent tube 170.

Figure 6:
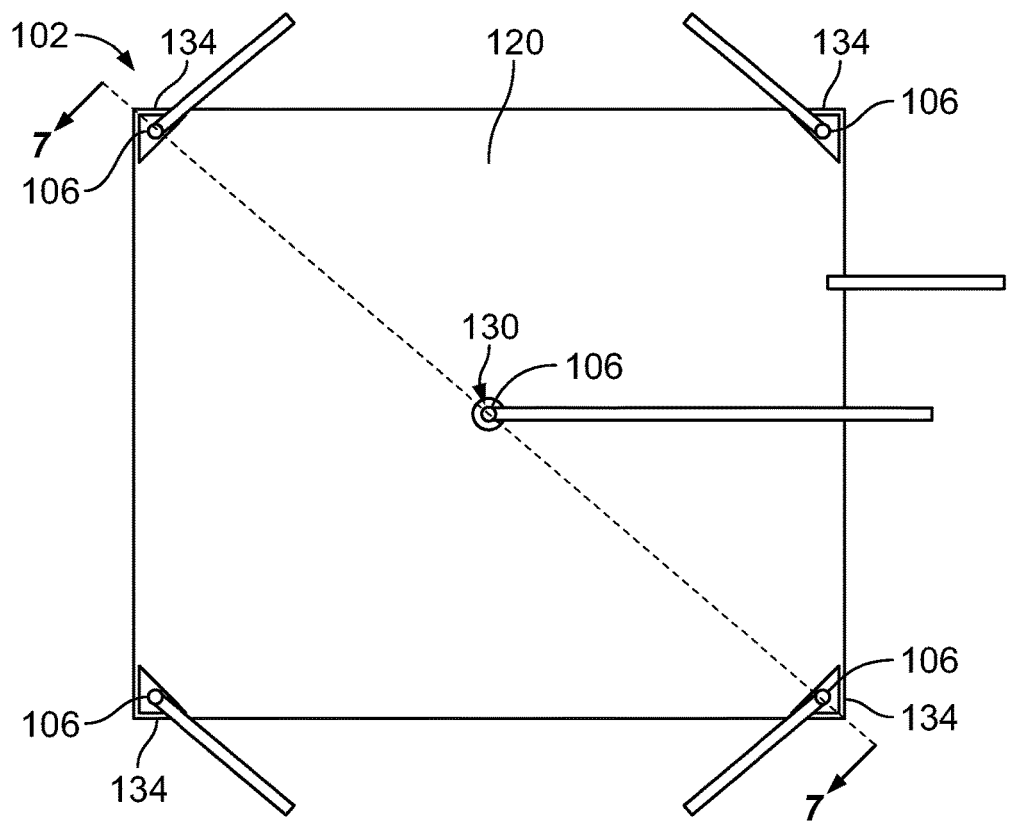
FIG. 6 illustrates a top view of a support panel assembly, according to an embodiment of the present disclosure.
Figure 7:
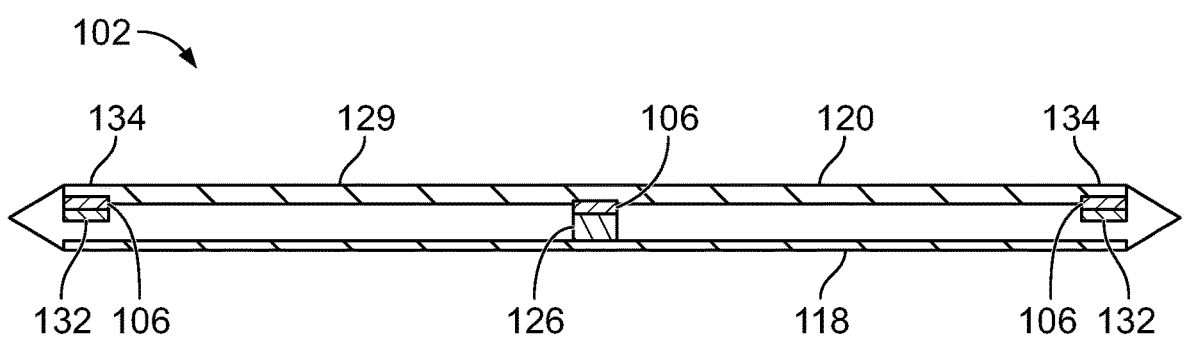
FIG. 7 illustrates a cross-sectional view of the support panel assembly through line 7-7 of FIG. 6.

FIG. 6 illustrates a top view of the support panel assembly 102, according to an embodiment of the present disclosure. FIG. 7 illustrates a cross-sectional view of the support panel assembly 102 through line 7-7 of FIG. 6. The support panel assembly 102 shown in FIGS. 6 and 7 is similar to the support panel assembly 102 shown in FIGS. 3-5, except that, in addition to the pressure sensor 106 at the center 130 of the support panel assembly 102, pressure sensors 106 are also located at the corners 134 of the support panel assembly 102. For example, the additional pressure sensors 106 downwardly from the lower surface 128 of the upper panel 118 at the corners 134. As such, the support panel assembly 102 includes five pressure sensors 106. In at least one embodiment, each of the pressure sensors 106 is in communication with the detecting control unit 108 (shown in FIG. 1).

As shown in FIG. 7, the pressure sensors 106 at the corners 134 are disposed above the bumpers 132. Optionally, the pressure sensors 106 are below the bumpers 132. In at least one other embodiment, one or more of the pressure sensors 106 is supported on the upper surface 129 of the upper panel 120.

In at least one other embodiment, the additional pressure sensors 106 are located at areas other than the corners 134. For example, the additional pressure sensors 106 are located inward from the corners around the pressure sensor 106 at the center 130. In at least one embodiment, pressure sensors 106 may be positioned between the pressure sensors 106 at the center 130 and outer peripheral edges of the support panel assembly 102. In at least one embodiment, the support panel assembly 102 does not include corners (for example, shaped as a disk), and includes the pressure sensor 106 at the center 130, and one or more additional pressure sensors 106 disposed between the center 130 and outer peripheral edges. In at least one embodiment, the pressure sensor 106 at the center 130 is a first pressure sensor, the pressure sensor 106 at or proximate to a first corner 134 is a second pressure sensor, the pressure sensor 106 at or proximate to a second corner 134 is a third pressure sensor, the pressure sensor 106 at or proximate to a third corner 134 is a fourth pressure sensor, and the pressure sensor 106 at or proximate to a fourth corner 134 is a fifth pressure sensors.

In operation, the pressure sensors 106 at the corners 134, along with the pressure sensor 106 at the center 130, output the pressure signals 110 (shown in FIG. 1) to the detecting control unit 108. The detecting control unit 108 analyzes the pressure signals 110 received from the pressure sensors 106 and is able to determine a total weight exerted on the support panel assembly 102, as well as the location of the weights via triangulation from the sensor signals 110 from the pressure sensors 106 at the corners 134 with the sensor signal 110 from the pressure sensor 106 at the center 130.

The support panel assembly 102 having the pressure sensors 106 at the corners 134 and the center 130 may be used to determine the magnitude and location of exerted pressure (for example, weight) on the support panel assembly 102. Accordingly, the support panel assembly 102 may be used in conjunction with the detecting control unit 108 to provide information regarding a desired weight distribution of individuals and objects within an internal cabin of a vehicle, such as an autonomous vehicle.

Figure 8:
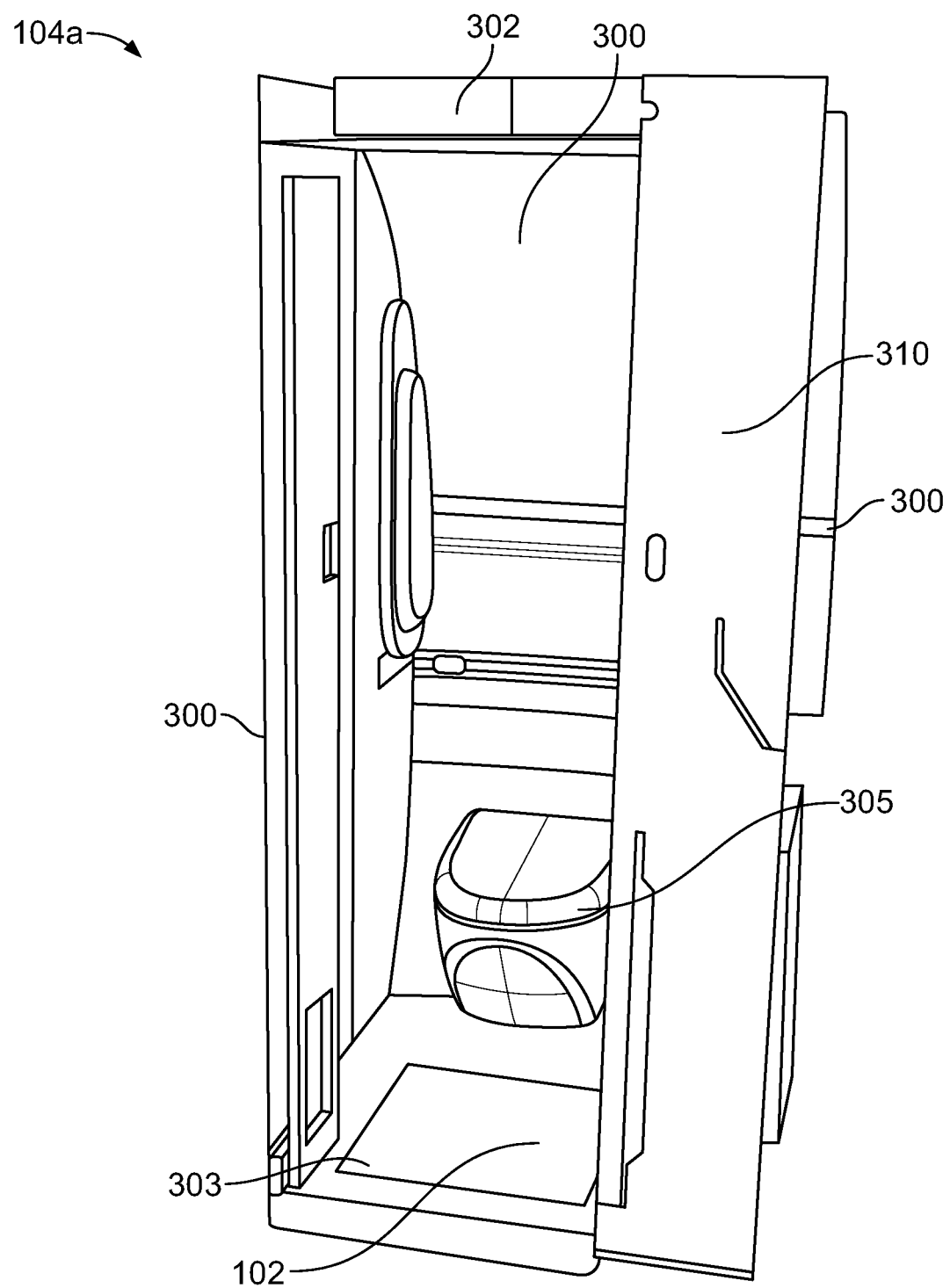
FIG. 8 illustrates a perspective front view of the lavatory, according to an embodiment of the present disclosure.

FIG. 8 illustrates a perspective front view of a lavatory 104*a*, according to an embodiment of the present disclosure. The lavatory 104*a* is an example of the internal space 104 shown in FIG. 1.

The lavatory 104*a* includes walls 300, a ceiling 302, and the support panel assembly 102, which forms at least a portion of a floor 303 of the lavatory 104*a*. A toilet 305 is supported over the floor 303. A door 310 is moveably coupled to a frame, which is coupled to at least one of the walls 300, the ceiling 302, and the floor 303. A shown in FIG. 3, the door 310 is in an open position. As described above, the support panel assembly 102 is used to detect occupancy of the lavatory 104*a*.

Figure 9:
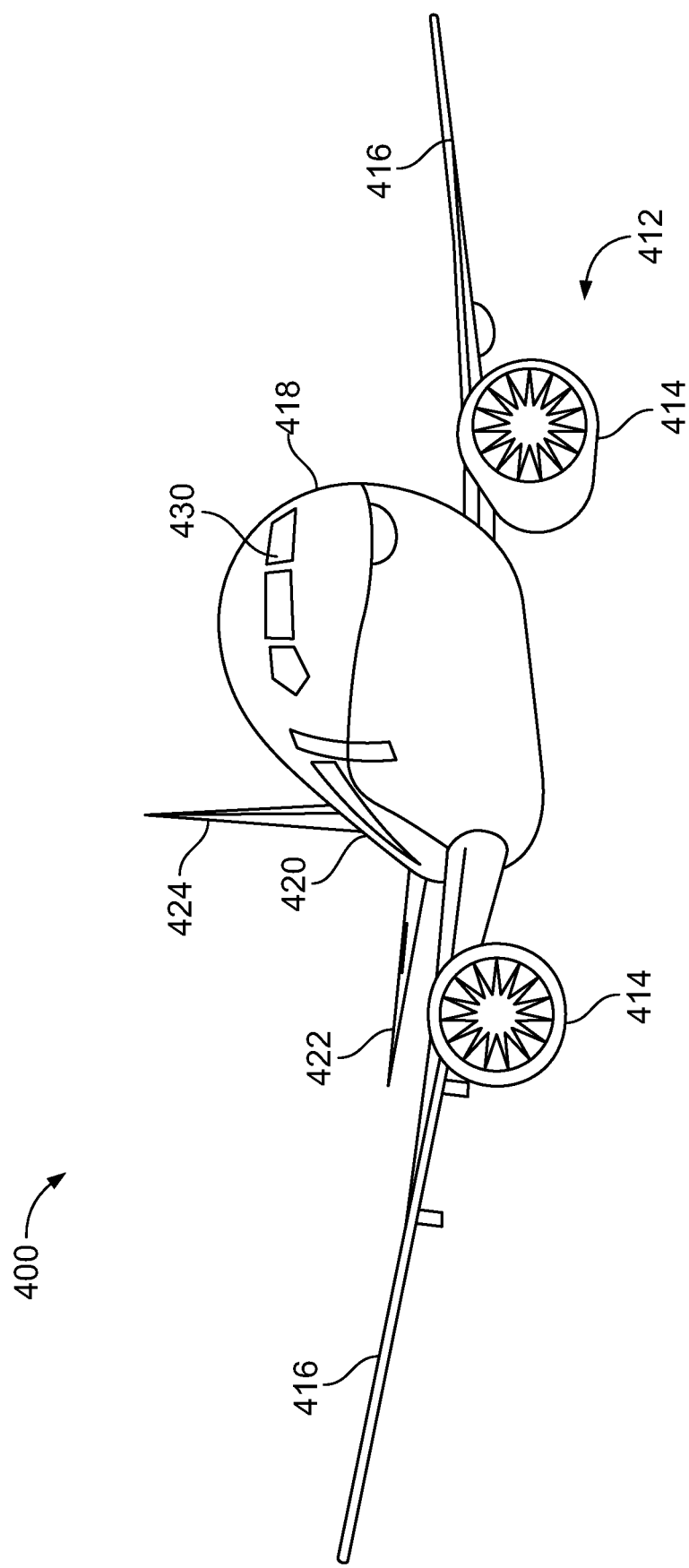
FIG. 9 illustrates a front perspective view of an aircraft, according to an exemplary embodiment of the present disclosure.

FIG. 9 illustrates a front perspective view of an aircraft 400, according to an exemplary embodiment of the present disclosure. The aircraft 400 includes a propulsion system 412 that includes two turbofan engines 414, for example. As another example, the propulsion system 412 includes more engines 414 than shown. The engines 414 are carried by wings 416 of the aircraft 400. In other embodiments, the engines 414 are carried by a fuselage 418 or an empennage 420. In at least one embodiment, the empennage 420 also supports horizontal stabilizers 422 and a vertical stabilizer 424. The fuselage 418 of the aircraft 400 defines an interior cabin, which includes a cockpit 430, for example.

The interior cabin includes one or more internal spaces 104 (shown in FIG. 1), such as lavatory 104*a* (shown in FIG. 8). In at least one embodiment, at least one support panel assembly 102, such as shown and described with respect to FIGS. 1-8, is positioned within the aircraft 400.

In at least one other embodiment, the aircraft 400 is sized and shaped differently than shown. For example, in at least one embodiment, the aircraft 400 is a helicopter. In at least one embodiment, the aircraft 400 is an autonomous aircraft having a cabin that accommodates ten or less passengers. Certain embodiments of the present disclosure are used with various other vehicles other than aircraft. For example, embodiments of the present disclosure are used with land-based vehicle (such as buses), watercraft (such as cruise ships), or the like.

Figure 10:
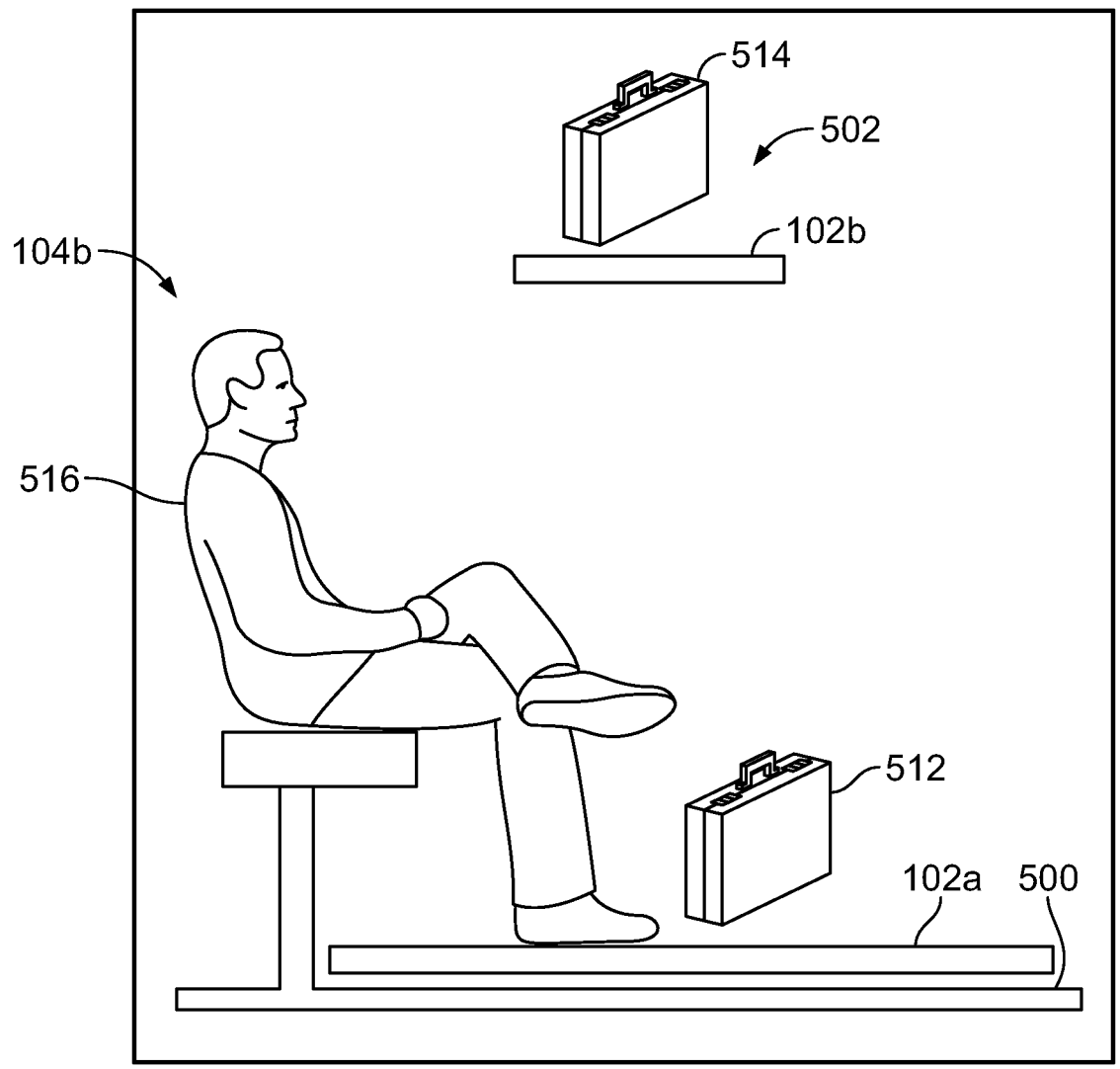
FIG. 10 illustrates a lateral internal view of an interior cabin, according to an embodiment of the present disclosure.

FIG. 10 illustrates a lateral internal view of an interior cabin 104*b*, according to an embodiment of the present disclosure. The interior cabin 104*b* is an example of the internal space 104 shown in FIG. 1. The aircraft 400 shown in FIG. 9 includes the interior cabin 104*b*.

The interior cabin 104*b* includes a first support panel assembly 102*a*, which forms at least a portion of a floor 500. A stowage bin 502 includes a second support panel assembly 102*b*. The first support panel assembly 102*a* detects presence of an individual 516 and objects 512 thereon. Similarly, the second support assembly 102*b* detects presence of objects 514 thereon. The first support panel assembly 102*a* and the second support panel assembly 102*b* detect weight of the individual 516 and the objects 512 and 514 resting thereon. In at least one embodiment, one or both of the first support panel assembly 102*a* and the second support panel assembly 102*b* are configured as the support panel assembly 102 shown and described with respect to FIGS. 6 and 7, thereby allowing weight distribution within the interior cabin 104*b* to be determined.

In at least one embodiment, the aircraft is an autonomous aircraft, and the detecting control unit 108 is in communication with flight controls for the autonomous aircraft. The detecting control unit 108 sends a presence signal to the flight controls indicating a presence of at least one individual in the interior cabin 104*b*. The flight controls may then adjust operation of the autonomous vehicle based on the presence signal(s). The flight controls may adjust security controls based on presence of weight within the interior cabin 104*b*. For example, based on a detected presence within the interior cabin 104*b*, the flight controls may close one or more doors after security procedures related to weight location within the interior cabin 104*b* to ensure balance of the aircraft, decrease a take-off rate, and/or the like.

Referring to FIGS. 1 and 10, in at least one embodiment, the detecting control unit 108 is in communication with the first support panel assembly 102*a* and the second support panel assembly 102*b*. The detecting control unit 108 monitors the pressure signals 110 output by the pressure sensors 106 of the first support panel assembly 102*a* and the second support panel assembly 102*b*. In at least one embodiment, the detecting control unit 108 is in communication with a user interface (such as a computer workstation, a handheld device, one or more monitors, or the like) that are configured to direct individuals to proper seat positions based on a desired weight distribution within the interior cabin 104*b*.

As described herein, embodiments of the present disclosure provide presence detection systems and methods, which are used with respect to internal spaces of vehicles, fixed structures (such as buildings), or the like. Embodiments of the present disclosure provide systems and methods for accurately determining whether or not an internal space, such as a lavatory within a commercial aircraft, is occupied. Further, embodiments of the present disclosure provide systems and methods for determining the occupancy of a lavatory without an individual performing a specific task to indicate such occupancy. Moreover, embodiments of the present disclosure provide systems and methods for quickly and efficiently determining an occupancy status of a lavatory. Additionally, embodiments of the present disclosure provides efficient systems and methods of assessing weight distribution within a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A support panel assembly, comprising:
a lower panel;
an upper panel pivotally coupled to the lower panel by a central pedestal; and
a first pressure sensor located about a center of the support assembly, and coupled to the central pedestal.

2. The support panel assembly of claim 1, wherein the first pressure sensor detects pressure exerted into the upper panel in response to the upper panel pivoting in relation to the lower panel about the central pedestal.

3. The support panel assembly of claim 1, wherein the first pressure sensor outputs a pressure signal indicative of pressure exerted into the upper panel, wherein the pressure signal is received by a detecting control unit.

4. The support panel assembly of claim 3, wherein the detecting control unit compares the pressure signal to a pressure threshold to determine presence of an individual on the support panel assembly.

5. The support panel assembly of claim 1, wherein the central pedestal is formed of an elastomeric material.

6. The support panel assembly of claim 1, wherein the first pressure sensor is disposed between the central pedestal and the upper panel.

7. The support panel assembly of claim 1, further comprising bumpers extending downwardly from a lower surface of the upper panel.

8. The support panel assembly of claim 7, wherein the bumpers are spaced apart from the lower panel.

9. The support panel assembly of claim 1, further comprising a sealing closeout that extends around outer peripheral edges of the lower panel and the upper panel, wherein the sealing closeout seals an internal chamber defined between the lower panel and the upper panel.

10. The support panel assembly of claim 9, further comprising a vent tube extending into the internal chamber.

11. The support panel assembly of claim 1, further comprising at least one additional pressure sensor.

12. The support panel assembly of claim 1, further comprising:
a second pressure sensor at a first corner;
a third pressure sensor at a second corner;
a fourth pressure sensor at a third corner; and
a fifth pressure sensor at a fourth corner.

13. A presence detection system, comprising:
a support panel assembly within an internal space, wherein the support panel assembly comprises:
a lower panel;
an upper panel pivotally coupled to the lower panel by a central pedestal;
bumpers extending downwardly from a lower surface of the upper panel;
a first pressure sensor coupled to the central pedestal, wherein the first pressure sensor detects pressure exerted into the upper panel in response to the upper panel pivoting in relation to the lower panel about the central pedestal, wherein the first pressure sensor outputs a pressure signal indicative of the pressure exerted into the upper panel;
a sealing closeout that extends around outer peripheral edges of the lower panel and the upper panel, wherein the sealing closeout seals an internal chamber defined between the lower panel and the upper panel; and
a vent tube extending into the internal chamber; and
a detecting control unit in communication with the first pressure sensor, wherein the pressure signal is received by the detecting control unit, wherein the detecting control unit compares the pressure signal to a pressure threshold to determine presence of one or both of an individual or an object on the support panel assembly.

14. The presence detection system of claim 13, wherein the first pressure sensor is disposed between the central pedestal and the upper panel, wherein the first pressure sensor is located about a center of the support panel assembly.

15. The presence detection system of claim 13, wherein the bumpers are spaced apart from the lower panel.

16. The presence detection system of claim 13, wherein the support panel assembly further comprises:
a second pressure sensor at a first corner;
a third pressure sensor at a second corner;
a fourth pressure sensor at a third corner; and
a fifth pressure sensor at a fourth corner.

17. The presence detection system of claim 13, wherein the internal space is within an interior cabin of a vehicle.

18. The presence detection system of claim 13, wherein the internal space is a lavatory.

19. A presence detection method, comprising:
detecting, by a first pressure sensor located about a center of a support assembly, and coupled to a central pedestal, pressure exerted into an upper panel that is pivotally coupled to a lower panel by the central pedestal, wherein said detecting is in response to the upper panel pivoting in relation to the lower panel about the central pedestal; and
outputting, by the first pressure sensor, a pressure signal indicative of the pressure exerted into the upper panel to a detecting control unit in communication with the first pressure sensor.

20. The presence detection method of claim 19, further comprising communicatively coupling the detecting control unit with flight controls for an autonomous aircraft.

21. The presence detection method of claim 20, further comprising sending, by the detecting control unit, a presence signal to the flight controls indicating a presence of at least one individual in an interior cabin of the autonomous aircraft.

22. The presence detection method of claim 21, further comprising adjusting operation of the autonomous aircraft based on the presence signal.

23. The presence detection method of claim 21, further adjusting security controls based on detected presence of weight within the interior cabin.

\* \* \* \* \*